United States Patent [19]

Sullivan

[11] Patent Number: 4,500,257

[45] Date of Patent: Feb. 19, 1985

[54] WIND TURBINE SPOILER

[75] Inventor: William N. Sullivan, Albuquerque, N. Mex.

[73] Assignee: The United States of America as represented by the United States Department of Energy, Washington, D.C.

[21] Appl. No.: 469,348

[22] Filed: Feb. 24, 1983

[51] Int. Cl.³ .............................................. F03D 7/06
[52] U.S. Cl. ...................................... 416/32; 416/87; 416/23; 416/51; 416/132 B; 416/169 R; 416/227 A
[58] Field of Search ................ 416/32, 169 B, 227 A, 416/197 A, 87, 88, 89 A, DIG. 7, DIG. 8, 23, 51 A, 132 B

[56] References Cited

U.S. PATENT DOCUMENTS

| 2,074,149 | 3/1937 | Jacobs | 416/88 |
| 2,076,520 | 4/1937 | Swanson | 416/88 X |
| 2,126,202 | 8/1938 | McColly | 416/175 A X |
| 3,038,543 | 6/1962 | Davidson | 416/32 X |
| 3,918,839 | 11/1975 | Blackwell et al. | 416/227 A X |
| 4,082,479 | 4/1978 | Rangi et al. | 416/32 X |
| 4,180,372 | 12/1979 | Lippert | 416/41 A X |
| 4,236,504 | 12/1980 | Cornelison | 416/227 A X |
| 4,247,252 | 1/1981 | Seki et al. | 416/197 A X |
| 4,247,253 | 1/1981 | Seki et al. | 416/32 X |
| 4,281,965 | 8/1981 | Stjernholm | 416/227 A |
| 4,335,996 | 6/1982 | Ross | 416/88 |

FOREIGN PATENT DOCUMENTS

| 510809 | 5/1952 | Belgium | 416/132 B |
| 2757266 | 11/1978 | Fed. Rep. of Germany | 416/DIG. 7 |
| 2298707 | 8/1976 | France | 416/117 |
| 23374 | 2/1980 | Japan | 416/32 |
| 7606729 | 12/1977 | Netherlands | 416/88 |
| 568783 | 4/1945 | United Kingdom | 416/89 A |
| 800890 | 9/1958 | United Kingdom | 416/23 |
| 2000233 | 1/1979 | United Kingdom | 416/DIG. 8 |

Primary Examiner—Everette A. Powell, Jr.
Attorney, Agent, or Firm—George H. Libman; Albert Sopp

[57] ABSTRACT

An aerodynamic spoiler system for a vertical axis wind turbine includes spoilers on the blades initially stored near the rotor axis to minimize drag. A solenoid latch adjacent the central support tower releases the spoilers and centrifugal force causes the spoilers to move up the turbine blades away from the rotor axis, thereby producing a braking effect and actual slowing of the associated wind turbine, if desired. The spoiler system can also be used as an infinitely variable power control by regulated movement of the spoilers on the blades over the range between the undeployed and fully deployed positions. This is done by the use of a suitable powered reel and cable located at the rotor tower to move the spoilers.

15 Claims, 5 Drawing Figures

U.S. Patent   Feb. 19, 1985   Sheet 1 of 2   4,500,257
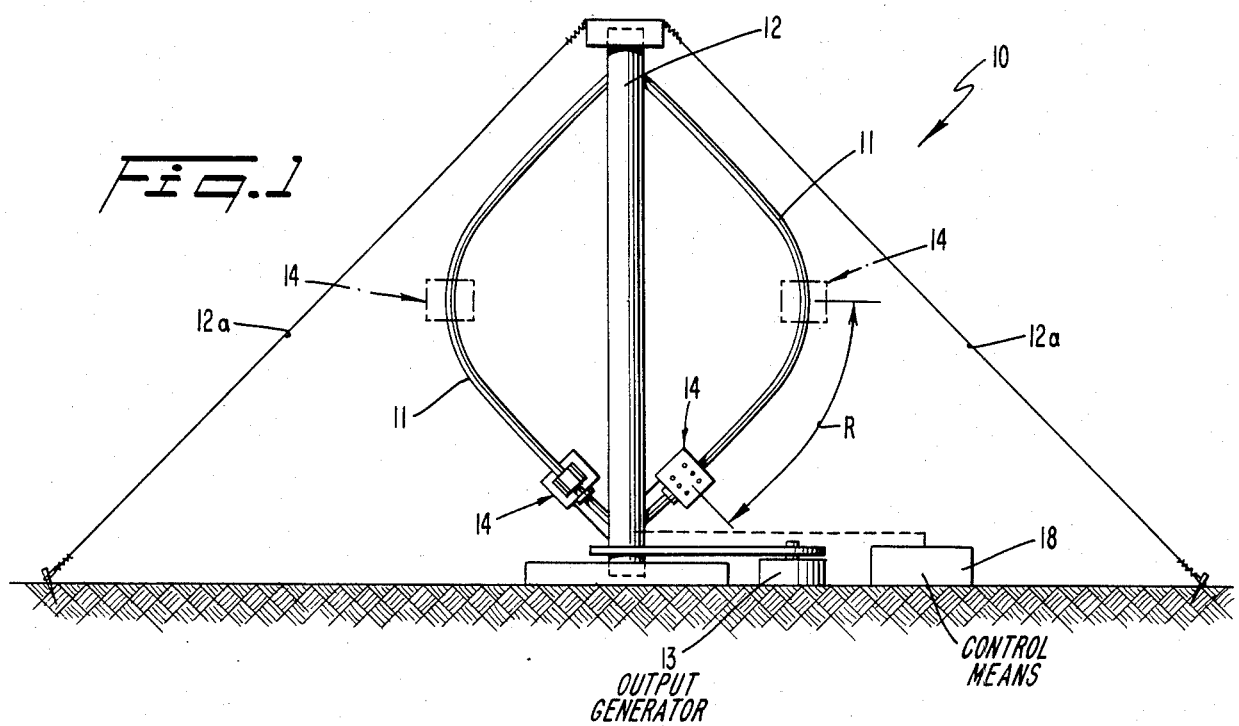
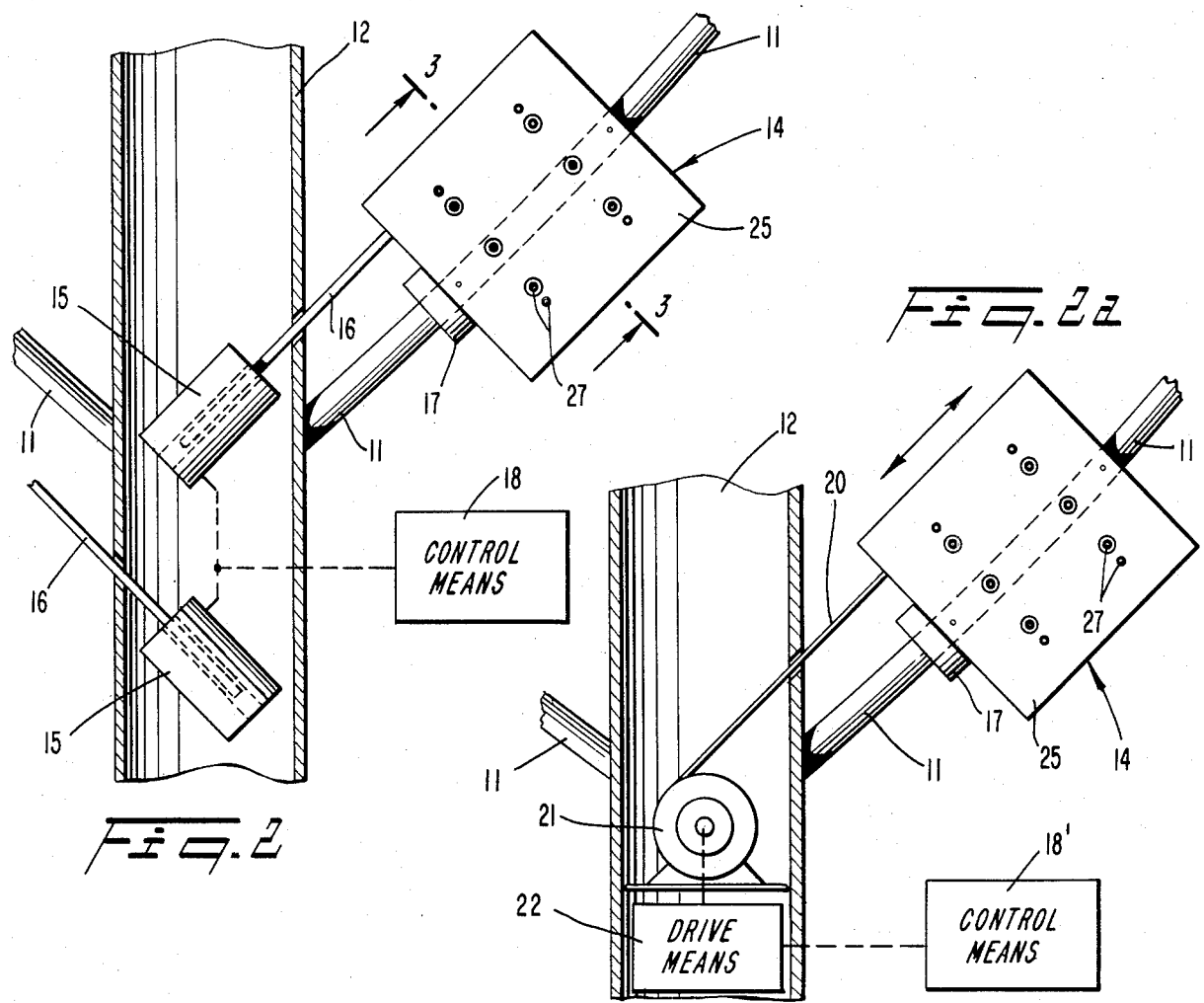

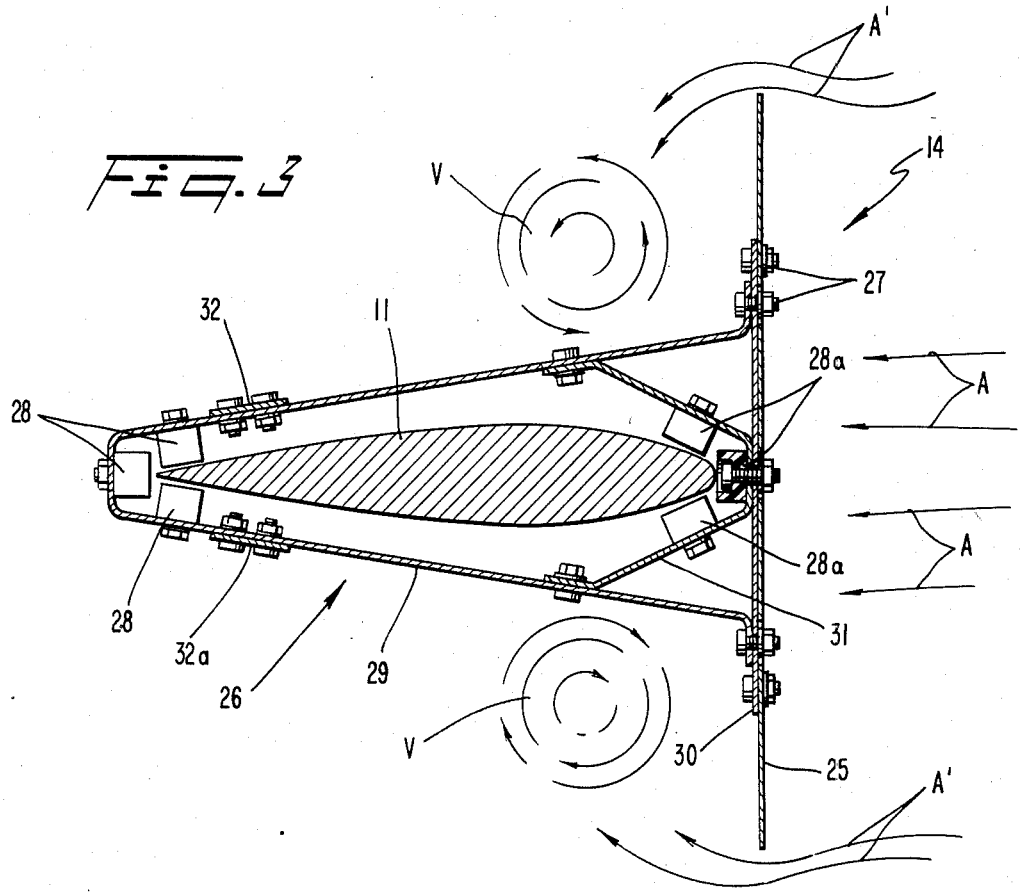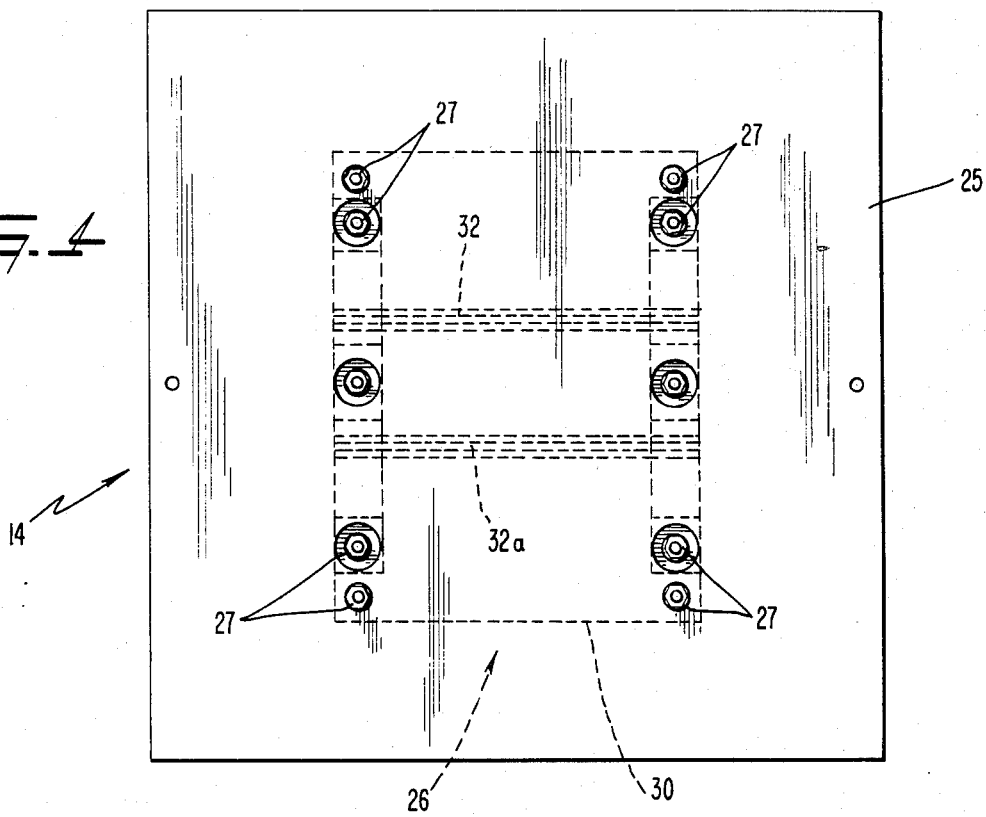

WIND TURBINE SPOILER

The U.S. Government has rights in this invention pursuant to Contract No. DE-AC04-76DP00789 between the U.S. Department of Energy and Western Electric Company.

BACKGROUND OF THE INVENTION

The present invention relates generally to devices for converting wind forces to usable energy, and more particularly to an overspeed and power control system for vertical axis wind turbines.

U.S. Pat. No. 1,825,500 to Banker, U.S. Pat. No. 1,846,162 to Thomas, U.S. Pat. No. 4,236,504 to Cornelison Jr., and U.S. Pat. No. 4,293,274 to Gilman disclose vertical axis wind turbines which have means for spoiling the aerodynamics of the rotating vanes when the rotation is too fast, such as the result of high winds. The spoiling of the aerodynamics is brought about by centrifugal force acting directly on the vanes or by suitable linkage means that are responsible to the centrifugal forces of high speed rotation.

The devices disclosed in these various patents do, however, have certain drawbacks. The spoiler means of the various devices are structurally complex and expensive to assemble. Also, maintenance of the spoiler means is often made difficult due to the remote physical location of the devices. The structural integrity of the turbine blades is often compromised where the spoiler is attached to the blade. Finally, the drag of these devices in their undeployed position has a degrading effect on the aerodynamic performance of the vertical axis wind turbine.

DISCLOSURE OF THE INVENTION

Accordingly, it is the primary object of the present invention to provide a wind turbine including an improved means for spoiling aerodynamics of the rotating blades.

Another object of the invention is to provide a wind turbine having spoiler means wherein the drag on the turbine when the spoiler means is in the undeployed position is minimized.

Still another object of the invention is to provide a wind turbine system with spoiler vanes wherein the structural integrity of the turbine blades is improved. Another object of the invention is to provide a spoiler means which is ordinarily readily accessible and simplified to facilitate maintenance.

A further object of the invention is to provide a reliable overspeed device for a wind turbine.

A still further object of the present invention is to provide a wind turbine having improved active aerodynamic and power controls.

Additional objects, advantages, and other novel features of the invention will be set forth in part in the description that follows and in part will become apparent to those skilled in the art upon examination of the following or may be learned with practice of the invention. The objects and advantages of the invention may be realized and attained by means of the instrumentalities and combinations particularly pointed out in the appended claims.

To achieve the foregoing and other objects in accordance with the purposes of the present invention as described herein an improved apparatus is provided for converting wind forces into usable energy. The invention includes turbine blades positioned about a rotor axis and spoiler means slideably mounted on each of the turbine blades. A latch or powered reel and cable located at the rotor tower hold the spoiler means in their undeployed position. The drag on the spoiler means is minimized in this position due to the low speed of the turbine blades near the axis of rotation. Upon releasing the latch or unreeling cable from the powered reel, centrifugal force causes the spoiler means to climb the turbine blades to a deployed outboard position. As the spoiler means climb to the fully deployed position equidistant from the turbine blade ends, the braking effect is proportionally increased. Maximum drag, and thus maximum speed reduction, occurs at the fully deployed position.

The spoiler means includes a spoiler vane or plate mounted substantially perpendicular to the turbine blade along the leading edge of the blade. A bracket assembly including at least one V-shaped member is used to mount the spoiler vane to the turbine blade. Guide blocks or suitable rollers are provided and positioned inside the bracket element for guiding action along the turbine blade. These guide blocks are preferably made of plastic, or any other appropriate low friction material. Polytetraflouroethylene plastic, such as TEFLON as marketed by E. I. DuPont de Nemours Company of Wilmington, Del., is a preferred plastic because of its excellent dimension stability and low friction properties. Finally, a stop collar is provided along the lower portion of the turbine blades to accurately position the spoiler vane in the undeployed (low wind resistance) position.

By equipping the wind turbine with a powered reel and cable rather than a simple latch, infinitely adjustable power control may be obtained, since the drag created by the spoiler vane increases as its distance from the rotor axis increases. Therefore, as cable is unreeled from the power reel, the spoiler vane climbs up the turbine blade away from the rotor axis and the braking effect increases. As the cable is reeled in on the powered reel, the spoiler vane slides down the turbine blade toward the rotor axis and the braking effect decreases.

Still other objects of the present invention will become readily apparent to those skilled in this art from the following description wherein there is shown and described a preferred and alternative embodiment of this invention, simply by way of illustration of one of the best modes and an alternative embodiment best suited to carry out the invention. As it will be realized, the invention is capable of still other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1 is a front view of a vertical axis wind turbine equipped with spoiler vane in accordance with the present invention;

FIG. 2 is an enlarged view of the base of the blades, showing one embodiment of the spoiler vane including a solenoid latch and control means;

FIG. 2a is also an enlarged, partially sectional view illustrating another embodiment wherein a powered reel, cable and control means are provided for power control of the wind turbine;

FIG. 3 is a cross-sectional view taken along line 3—3 of FIG. 2 showing typical mounting of the spoiler vane on the turbine blade; and FIG. 4 is a front view of the spoiler plate.

Reference will now be made in detail to the present preferred and alternative embodiment of the invention, an example of which is illustrated in the accompanying drawings.

DETAILED DESCRIPTION OF THE INVENTION

Reference is now made to FIG. 1 showing a troposkien vertical axis wind turbine 10 for converting wind forces into usable energy. The force of the wind causes turbine blades 11 to rotate around a rotor tower 12 vertically positioned by guy wires 12a. The turbine 10 drives an output generator 13 or suitable load through a suitable drive connection.

Spoiler means in the preferred embodiment shown takes the form of a vane, generally designated by reference numeral 14, in full line outline in the undeployed position near the base of the rotor tower 12. The drag from the spoiler vane 14 is minimized in this undeployed position due to the low speed of the turbine blades 11 near the rotor axis. When the spoiler vane 14 is fully deployed, as shown in phantom lines in FIG. 1, the drag thereby created is substantial due to the high speed of the turbine blades 11 at that point, and maximum braking of the wind turbine 10 occurs.

FIG. 2 illustrates a first embodiment allowing overspeed protection for wind turbine 10. A latch 15 is mounted inside at the base of rotor tower 12. A mechanical linkage 16 such as a rod, chain or cable, connects the latch 15 to the spoiler vane 14. A stop collar 17 is provided to accurately position the spoiler vane 14; i.e. each vane 14 is kept from sliding too far down the turbine blade 11 and coming into contact with the rotor tower 12. A control means 18 is provided to operate the latch 15. Upon releasing the latch 15 by operation of the control means 18, the spoiler vane 14 climbs the turbine blade 11 due to the action of centrifugal force to the deployed outboard position (see Phantom in FIG. 1 after moved along range R). Once deployed, the spoiler vane 14 causes sufficient braking to stop turbine 10.

As shown, latch 15 in one embodiment comprises a solenoid and control means 18 is an electrical or mechanical speed sensor which causes solenoid latch 15 to release linkage 16 when overspeed is detected. A mechanical latch powered by centrifugal forces could also be used instead of the solenoid latch 15 to release the spoiler vane 14 at a selected rotor speed.

FIG. 2a shows another embodiment allowing power control of the drag regulating function on the wind turbine 10. A cable 20 connects the spoiler vane 14 to a reel 21. Drive means 22 is provided to power the reel 21. Both the reel 21 and the drive means 22 are located adjacent the base of the rotor tower 12.

A control means 18' is provided to operate the drive means 22. By unwinding the cable 20 from the reel 21, the spoiler vane 14 may be played out along the turbine blade 11 as moved by centrifugal force to any chosen outboard position along the range of movement R. The further up the turbine blade 11 the spoiler vane means 14 travels, the greater the braking effect. By reeling in the cable 20 onto the reel 21, the spoiler vane 14 is brought down the turbine blade 11 toward the undeployed position near the rotor tower 12 at the stop collar 17. Again, at this point the drag created by the spoiler vane 14 is minimized due to the low speed of the turbine blades 11 near the rotor axis.

FIG. 3 is a cross-sectional view along line 3—3 of FIG. 2 showing a preferred mounting of the spoiler vane 14 to the turbine blade 11. The spoiler vane 14 includes a spoiler plate 25 mounted substantially perpendicular to the axis of the blade 11 and thus designed to be impacted by the wind thereby causing a disruption of the air flow (note air flow arrows A, FIG. 3). As the air flow A' extends around the edges of the plate 25, vortex regions V are formed generating drag on the blade 11 and slowing the rotation, as desired.

The spoiler plate 25 is slideably mounted to the turbine blade 11 by means of a bracket assembly generally designated by reference numeral 26. The bracket assembly 26 includes two substantially identical V-shaped frame members 29, two base frame members 30 and two V-shaped reinforcing members 31. Each of the two cooperating V-shaped members 29 and 31 are joined in opposing relation so as to encircle the turbine blade 11. The two frame members 29 are connected together by straps 32, 32a at the rear or closed end to stabilize the bracket assembly 26.

There are three guide blocks 28 provided on the inner surface of the V-shaped members 29 in order to embrace the bracket assembly 26 and provide intimate contact with the trailing edge of the turbine blade 11. Three more guide blocks 28a are provided along the inner surface of the inner V-shaped member 31 in order to embrace the bracket assembly 26 and provide intimate contact with the leading edge of the turbine blade 11. These guide blocks 28, 28a may be made of TEFLON or other suitable material to allow the spoiler vane 14 to easily slide along the turbine blade 11.

The guide blocks 28, 28a discussed above are particularly suitable for the overspeed embodiment of the invention of FIG. 2. In this embodiment, the invention is actuated for a one-time use to prevent the turbine 10 from overspeed condition which might result in a destructive mechanical separation of blades 11 from tower 12. Guide blocks require little maintenance and provide reliable operation.

However, for the control embodiment of FIG. 2a where vane 14 will be continuously sliding up and down blade 11, it is advantageous to substitute roller bearings for blocks 28, 28a. The additional maintenance (lubrication) of rollers is offset by the reduced wear on blade 11.

In summary, numerous benefits have been described which result from employing the concepts of the invention. The use of either the solenoid latch 15, as provided in FIG. 2, or the cable 20, reel 21 and drive means 22 as provided in FIG. 2a, allows efficient, rapid deployment and at the same time does not compromise the structural integrity of the turbine blade 11. The drag on the wind turbine 10 when the spoiler vane 14 is in the undeployed position is advantageously reduced, and degradation of the aerodynamic performance of the wind turbine 10 during normal operation is avoided. The vanes 14 each include a strong, yet light-weight bracket assembly 26 for mounting on the blade 11. Low friction guide blocks 28, 28a position and guide the vane 14 in its movement. In the simplest form, a latch 15 holds the vane in the undeployed position, and upon release the vane 14 moves by centrifugal force to the full, deployed position. The physical location of the assembly near the rotor base greatly facilitates maintenance and installation.

The use of the cable 20 and reel 21, as shown in FIG. 2a, allows for positive speed control of the wind turbine 10. As in the first embodiment, when the spoiler vane 14 is positioned near the rotor tower 12 at the stop collar 17, the drag created is minimized. As the spoiler vane 14 is positioned further up the turbine blade 11 (outboard along the accurate range of movement R), the drag or braking effect steadily increases until it reaches a maximum at the point where the spoiler vane 14 is located equidistant from the turbine blade ends.

Although the invention is shown on and most advantageously used with a troposkien vertical axis wind turbine as shown in the figures, it is to be understood that the invention may be used on any vertical or horizontal axis wind turbine where the vane may be held near the axis of rotation until release when it slides along turbine structure consisting of either a blade or blade support to a position further away from the axis of rotation.

The foregoing description of a preferred and alternative embodiment of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

I claim:

1. A wind turbine comprising:
   a vertical axis wind turbine including a vertical rotor axis and a curved blade having two opposed ends, each end being connected to said axis;
   spoiler vane means slidably mounted on said blade;
   holding means to hold said vane means in an undeployed position near said rotor axis; and
   control means for said holding means; whereby upon release of said holding means by operation of said control means, said spoiler vane means slides along said blade to a deployed outboard position spaced from said rotor axis to produce a braking effect on said wind turbine.

2. A wind turbine of claim 1 wherein:
   said holding means comprises a powered reel and a cable, said cable connecting said powered reel to said spoiler vane means to position and hold said spoiler vane means in position along a range of movement from the undeployed position to the deployed outboard position;
   said control means operating to provide unreeling of said cable to allow said spoiler vane means to slide up the turbine blades to produce an increased braking effect; and upon reeling in said cable said spoiler vane means slide down said turbine blade to produce a reduced braking effect.

3. A wind turbine as in claim 1, wherein said spoiler vane means includes a spoiler plate mounted substantially perpendicular to the turbine blade.

4. A wind turbine as in claim 3, wherein said turbine blade includes a leading and a trailing edge; said spoiler plate being mounted adjacent said leading edge.

5. A wind turbine as in claim 4, wherein a bracket assembly is provided for mounting said spoiler plate to said turbine blade.

6. A wind turbine as in claim 3, wherein a bracket assembly includes at least one V-shaped member positioned to embrace the blade.

7. A wind turbine as in claim 6, wherein guide blocks are provided and positioned inside said V-shaped member for guiding said bracket assembly along said turbine blade.

8. A wind turbine as in claim 5, wherein three guide blocks are positioned in a substantially triangular formation to provide intimate contact with the leading edge of said turbine blade.

9. A wind turbine as in claim 8, wherein three guide blocks are positioned in a substantially triangular formation to provide intimate contact with the trailing edge of said turbine blade.

10. A wind turbine as in claim 9, wherein said guide blocks are made of low friction plastic.

11. A wind turbine as in claim 1, wherein said holding means is a latch, said vane means being operative to move to the deployed position by centrifugal force.

12. A wind turbine as in claim 11, wherein a mechanical linkage connects said latch to said spoiler vane means.

13. A wind turbine as in claim 2, wherein said powered reel is located adjacent the rotor axis.

14. A wind turbine as in claim 2, wherein said powered reel comprises means for playing out said spoiler vane to any desired position along said turbine blades.

15. A wind turbine as in claim 1, wherein a stop collar is provided on the turbine blade adjacent the rotor axis, said stop collar accurately locating the undeployed position of the spoiler vane means along the turbine blade.

* * * * *